United States Patent Office 3,017,158
Patented Jan. 16, 1962

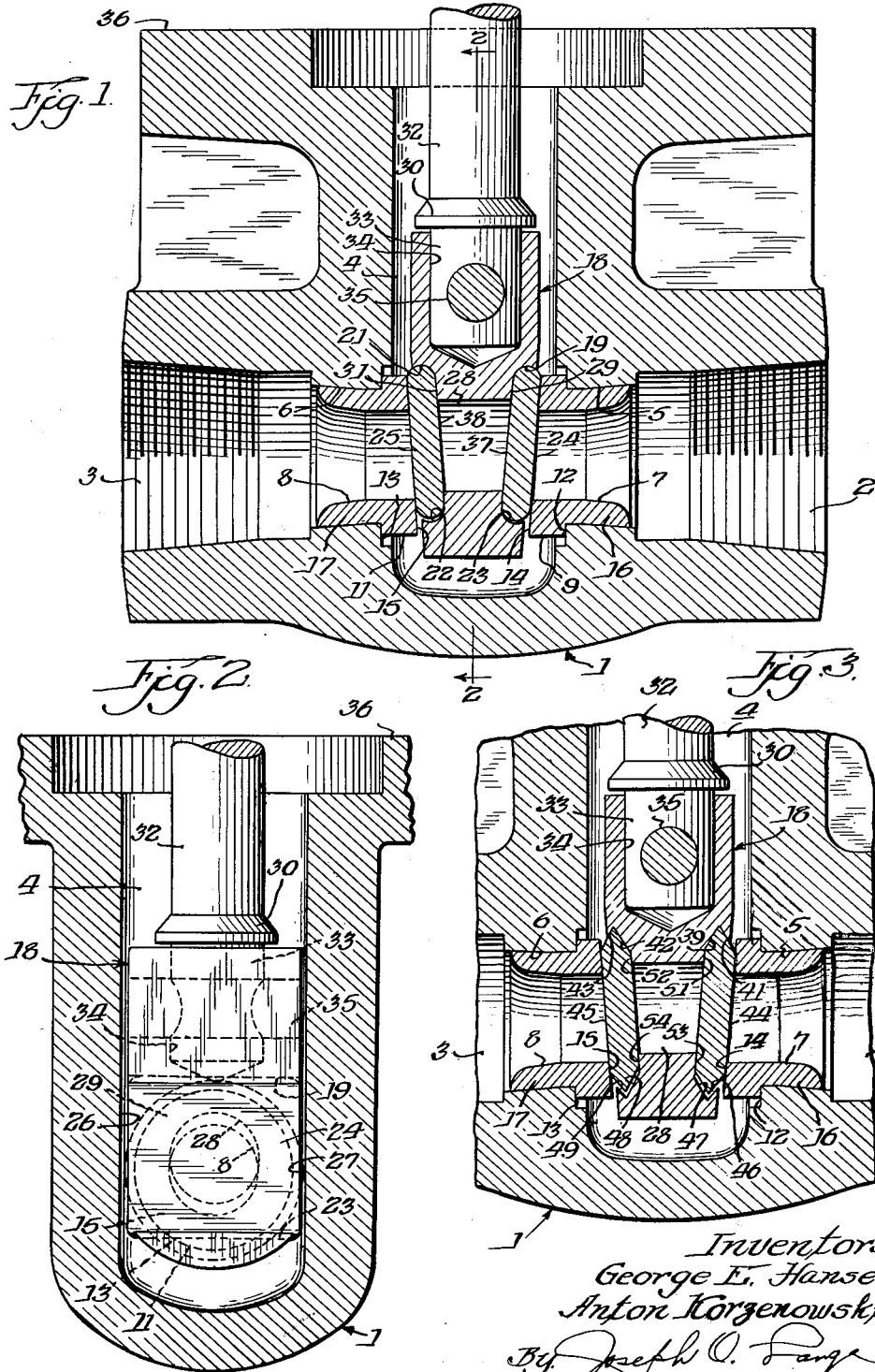

3,017,158
RENEWABLE DISC INSERT FOR GATE VALVES OR THE LIKE
George E. Hansen, Elmwood Park, and Anton Korzenowski, Brookfield, Ill., assignors to Crane Co., Chicago, Ill., a corporation of Illinois
Filed Mar. 18, 1959, Ser. No. 800,313
5 Claims. (Cl. 251—84)

This invention relates to valves generally, and more particularly it is concerned with a type of gate valve construction in which the closure member gate therefor is provided with easily renewable inserts for facilitating replacement, repair, inspection and related ready maintenance of the valve seating means.

At the outset, in order to obtain a better appreciation of the advantages of this contribution, it should be understood that heretofore when gate valve discs for repair or replacement purposes have normally been required it has necessitated replacing a complete valve gate or disc When the seat contact face thereof has become marred scored or otherwise damaged in the course of service, such replacement has necessarily been relatively expensive. In addition, because it was frequently necessary to supply a complete valve gate or closure member when the repair was being made special seating operations were required, thus adding to the delay and expenses of the valve disc repair or replacement.

It should also be understood in this connection that in manufacturing the replacement valve disc with integral valve seating surfaces thereon, that it has been not only difficult but also costly in the special machining required in the oppositely disposed end faces to provide a taper in the valve disc accurately corresponding with the seats within the valve casing to be carefully fitted with the repaired disc.

It is therefore one of the more important objects to provide for a valve gate construction in which the renewable insert of this invention may be easily machined on the relatively flat surface of a machine tool block, for example, and conveniently ground or lapped to a high degree of precision.

Another object is to provide for a gate valve construction in which the valve closure insert can easily and conveniently be reversed during its course of service without costly line shut-downs and by virtue of such reversibility substantially doubling the life of the valve closure.

Another object is to provide for a gate valve construction in which the seat contacting inserts may be made of suitable materials to match exacting service conditions encountered in the field and without necessarily requiring that the entire valve closure or the insert carrier be made of the same material as the insert which may be more expensive and which also frequently would not lend itself economically to the structural function of the insert carrier.

A further object is to provide for a valve closure renewable insert in which the material employed for such insert may be either metallic or non-metallic, as, for example, of the cobalt or chromium-nickel alloy bases, in addition to such plastics as nylon and others.

A further object is to provide for a valve closure mounting of a renewable insert in which the form and arrangement fo the mounting or the material used or both aids substantially in providing for valve seat tightness.

Other objects and advantages of our invention will become more readily apparent upon proceeding with the description read in connection with the following drawings, in which:

FIG. 1 is a fragmentary sectional assembly view of a gate valve embodying our invention;

FIG. 2 is a sectional view taken on the line 2—2 of FIG. 1; and

FIG. 3 is a fragmentary sectional view of a modified form.

Similar reference numerals refer to similar parts throughout the several views.

Referring now to FIG. 1, a conventional gate valve body or casing generally designated 1 is shown, having the usual conduit receiving ends 2 and 3 for connection to a pipe line, which connections while indicated as being threaded, may obviously be otherwise formed to receive the conduit constituting the said pipe line. At the central portion of the casing, the said pipe receiving connections 2 and 3 communicate with the valve chamber 4 having at its outer central limits the oppositely disposed communicating horizontal ports 5 and 6 within which the respective body seat rings 7 and 8 are received in fluid sealing relation thereto. While the said seat rings are indicated as being attached to the casing 1 by being rolled over on a tapered annular surface in order to hold the flange portions thereof at 9 and 11 against the respective annular shoulder surfaces 12 and 13 of the said casing, it should be understood that other means of attachment for the said seat rings may be employed, as, for example, by threading, soldering, brazing, welding, or the like.

It will, of course, also be understood that since the annular valve contact surfaces are tapered it is necessary in order to effect the accurate angularity of the tapered sufaces at 14 and 15, that the seat rings be adjustably rotated on the shank portions 16 and 17, so that the taper of the surfaces 14 and 15 will extend in a proper direction to receive the similarly tapered surfaces of the reciprocably movable closure member generally designated 18 in fluid sealing relation.

The novel form of our invention lies in the provision for arranging the closure member 18 with oppositely disposed and transversely extending cut-out segments or recesses defined by the grooves 19 and 21. As indicated more clearly in FIG. 2, the cut-out segments extend transversely at the upper portion along the edges 19 and 21 and at the lower limits the segments are defined by the edges 22 and 23. The said grooves as defined by the respective surfaces 19 to 23, inclusive, receive the seat inserts 24 and 25, which it will be understood are slidingly inserted relatively loosely (note arcuate clearance above the rounded surfaces 22 and 23) from either one of the open ends of the grooves along the edges defined by the said surfaces. As will be more clearly apparent in FIG. 2, the inserts 24 and 25 are thus held in place and are prevented from falling out of the open ends of the grooves by the provision that the closure member 18 substantially spans the valve chamber 4 as defined by the casing guide surfaces 26 and 27, thereby not only guiding the closure member in the course of its reciprocal movement, but also effectually preventing substantial endwise movement of the inserts in either direction during the course of such operation of the valve.

The closure member 18 may, if desired, be provided with a central apertured portion 28, although this is not necessary in all cases, but it does help in some cases to position the inserts more accurately within the oppositely disposed grooves of the said closure member. As previously mentioned, the inserts 24 and 25 are preferably made of such size, form and proportions as to fit relatively loosely within the grooves of the closure member to bear against the surfaces at 29 and 31 when the valve is being seated. This slight looseness in fit within the cut-out segments allows for slight relative movement to take place both axially and laterally as the valve gate is being seated and also when being unseated. It will be apparent that because of the edge clearances employed and the upper and lower rounded surfaces employed in defining the width of the insert members 24 and 25, the latter are moved upwardly to bear against the rounded surfaces 19 and 21 when the valve is being seated. Further, by virtue of the inner support provided by the annular tapered surfaces 29 and 31, an outward thrust is imparted to the respective inserts in bearing against their seating surfaces 14 and 15 of the body seat rings. This arrangement effects fluid tightness between the outer surfaces of the said inserts and the surfaces 14 and 15 of the said body seat rings.

It will be understood that when opening the valve from the position illustrated there will generally occur a slight movement upwardly of the valve closure 18 relative to at least one of the inserts 24 or 25, thus allowing the insert to contact the closure surface 22 or 23 and then be lifted and broken away from the seat contact at 14 and 15. Thus, there is a desirable slight retraction of the inserts before actual movement upwardly of the inserts occurs.

The valve is operated by the conventional stem 32, which may be attached by a number of different ways to the valve closure member 18, but in this case is shown as having the shank 33 received within the bore 34 and held in place by means of the pin 35 which preferably extends through the entire head portion of the closure member, as indicated more clearly in FIG. 2. The manner in which the valve stem is actuated is relatively unimportant insofar as the invention is concerned. In the illustration, the stem is of the non-rotating type and is therefore provided with the usual stem threads (not shown) engageable with a bonnet or yoke (also not shown) supported upon the bonnet flange upper surface 36. An integral collar 30 on the stem serves as a stop and seal in the valve wide open position. It will, of course, be appreciated that as wear occurs on the outer seating surfaces of the insert members 24 and 25, they can easily be reversed or turned around to expose the opposite surfaces 37 and 38 to the contact with the valve seats 14 and 15 and thus caused to function as the new seating surfaces for the valve closure member.

The particular form of structure used to exemplify our invention may vary quite substantially from that illustrated in FIGS. 1 and 2 and yet fall within the scope or principles of operation described in connection with the latter figures. In this connection, attention is directed to the modification shown in FIG. 3, in which the closure member 18 is provided with the central aperture 28, but in this form, the oppositely disposed relief portions of the cutaway segments or grooves for the inserts 44 and 45 are defined by oppositely tapered annular surfaces 39 and 41 and 42 and 43 at the upper portion of the cut-away segments. The inserts 44 and 45 are likewise provided with the oppositely tapered edges to fit relatively loosely within the recesses defined by the said tapered edges and at the lower portion by the oppositely tapered surfaces 46, 47, 48, and 49. In this construction, the inserts 44 and 45 are supported against end thrust by means of the upper oppositely disposed tapered surfaces 51 and 52 and at the lower portion thereof by the oppositely disposed tapered annular surfaces 53 and 54. Upon closing the valve embodying this amended form, it should be understood that the tapered edges 39 and 41 will cause the respective inserts 44 and 45 to move slightly outwardly against the seating surfaces 14 and 15 of the body seat rings. Similarly, when the valve is being opened, the edges 46 and 49 will cause the inserts to be slightly retracted by virtue of their slight movement inwardly along the respective inclined planes defined by the said surfaces. In all other respects, the structure and operation is similar to that described in connection with FIGS. 1 and 2. In the latter connection, it should be clear that under some conditions it may be desirable so long as insert retaining means are provided plain edges may be used instead of the rounded or intersecting type to define the side limits of the inserts or retaining segments or both.

It will be apparent that a relatively economical and effective means has been provided for a valve seating mechanism in which valve seat tightness can be easily and conveniently maintained by the simple expedient either of replacing or reversing the inserts to renew the valve seating contact surfaces thereof whenever valve leakage occurs in the course of service.

While a plurality of embodiments has been disclosed and described herein, it should be apparent that the manner of exemplifying our invention is capable of being set forth in many other modifications falling within the spirit of our invention. We desire, therefore, to be limited only to the extent of the claims appended hereto interpreted in light of such limitations as may be imposed by the state of the art.

We claim:

1. In a gate valve comprising a casing with ports therethrough and a valve chamber having oppositely disposed walls between the ports, the chamber having its outer limits defined by oppositely disposed valve seat means, a reciprocally movable closure member for predetermined fluid sealing contact with said seat means, the said closure member having on at least one face adjoining the said seat means a cut-out substantially transversely extending segment of oblong configuration, the said segment being continuous with open ends and extending in a plane substantially at right angles to the valve vertical axis, a relatively thin plate-like insert slidably received within the cut-out segment of substantially the same length as the cut-out segment, the said segment cut-out including means for retaining said plate-like insert on said closure member, the oppositely disposed walls of the casing chamber restricting the said insert against substantial endwise sliding movement relative to the closure member during the movement of the said closure member in opening and closing the valve, the length of said insert being substantially defined by the width of said closure member.

2. The subject matter of claim 1, the cut-out segment of said closure member having rounded oppositely disposed surface portions for receiving the said insert, the insert portion slidably received within the segment being similarly rounded on its oppositely disposed edges.

3. The subject matter of claim 1, the cut-out segment of the closure member being defined in cross-section by a plurality of converging surfaces for receiving similarly formed edge portions of the insert, certain of said insert edge portions extending in the same inclined plane as the closure member converging surfaces in normal assembly of the insert with said closure member and after said movements of the closure member.

4. In a gate valve comprising a casing with ports therethrough and having tapered valve seat means, a reciprocally movable closure member cooperating with said seat means, the said closure member having on at least one face thereof a recessed segment formed by a substantially transversely extending continuous groove of a length substantially defined by the width of the closure member, a plate-like insert mounted loosely within the said closure member groove, and means provided by the inner walls of said casing between said valve seat means for inhibiting substantial endwise movement of the said insert in a plane extending transversely relative to the vertical axis of the said closure member, the groove having its upper and lower limits defined by substantially oppositely disposed surface inclined in a plurality of directions and predeterminately substantially abutting one of said surfaces against one edge portion of the said insert at the opening of the valve and substantially abutting another of said surfaces against the other edge of the said insert during the closing of the valve.

5. In a gate valve comprising a casing with ports therethrough and having tapered valve seat means and a valve chamber therebetween, a reciprocally movable closure member in the valve chamber cooperating with said seat means, a stem for said closure member, the said closure member having on at least one face thereof a recessed portion defined by a transversely extending substantially horizontal groove of a length equal to the width of said closure member, a relatively thin plate-like insert loosely mounted within the said continuous groove, the upper and lower limits of the groove being formed with surfaces cooperating with similarly formed surfaces defining the upper and lower limits of the said insert whereby to provide for slight transverse movement therebetween to effect forward thrust of the said insert in a direction toward the valve seat means in valve closing and for retraction of the insert from the seat means in the initial valve opening movement, and means defining the side disposed walls of said valve chamber for inhibiting substantial endwise movement of the said insert tranversely relative to an axis through the said closure member which axis is concentric with the axis of the said stem, the said inhibiting means guiding the said closure member in said chamber in its valve opening and closing movements.

References Cited in the file of this patent

UNITED STATES PATENTS

| | | |
|---|---|---|
| 737,414 | Jones | Aug. 25, 1903 |
| 936,454 | Jefferson | Oct. 12, 1909 |

FOREIGN PATENTS

| | | |
|---|---|---|
| 357,542 | France | Nov. 14, 1905 |
| 876,364 | France | July 27, 1942 |
| 733,584 | Germany | Mar. 30, 1943 |
| 955,014 | Germany | Dec. 27, 1956 |
| 1,017,869 | Germany | Oct. 17, 1957 |